United States Patent Office 2,752,358
Patented June 26, 1956

2,752,358
INDOLYL COMPOUNDS AND A PROCESS OF PREPARING THEM

Gustav Ehrhart, Am Burgberg, Bad Soden (Taunus), and Heinrich Leditschke, Frankfurt am Main, Germany, assignors to Farbwerke Hoechst Aktiengesellschaft vormals Meister Lucius und Bruning, Frankfurt am Main-Hoechst, Germany No Drawing. Application December 30, 1952,
Serial No. 328,831

Claims priority, application Germany January 5, 1952

6 Claims. (Cl. 260—309.6)

The present invention relates to indolyl compounds and to a process of preparing them.

Various processes are already known for preparing indolyl-methyl-imidazolines by reacting indolyl-acetonitrile with hydrogen sulfide and ethylene-diamine (see U. S. Patent No. 2,505,247). Furthermore, it is known that diphenylethyl-imidazolines are obtained by reacting hydrogen chloride and alcohol upon diphenyl-propionitrile and then reacting the amino-ether obtained with ethylene-diamine (see "Journal of American Chemical Society," (1950), page 188 et seq.).

Now we have found that new indolyl-aryl-ethyl-imidazolines can be prepared by reacting an alpha-cyano-beta-arylacrylic acid ester with an indolyl-magnesium-halide to obtain a corresponding alpha-cyano-beta-indolyl-beta-aryl-propionic acid ester. After hydrolysis and decarboxylation, the nitriles obtained are transformed in known manner into the corresponding indolyl-aryl-ethyl-imidazolines.

By hydrolysis and decarboxylating, the nitriles of the general formula

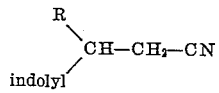

are obtained by reacting an acrylic acid ester of the general formula

R—CH=C—C O O—alkyl
    |
    CN wherein R stands for an aromatic radical, particularly for a phenyl radical, which may be substituted especially by alkoxy groups or halogen atoms, with indolyl-magnesium halide to obtain the beta-disubstituted alpha-cyano-propionic acid esters of the general formula

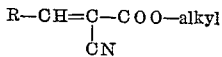

in which case the cyclic radicals may still have substituents.

If the nitriles formed are treated in alcohols with hydrochloric acid gas, the imino-ethers are produced therefrom from which, by the reaction with ethylene-diamine, the imidazolines of the formula

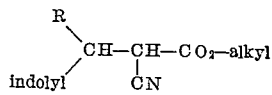

are obtained.

Suitable alpha-cyano-beta-aryl-acrylic acid esters are especially the esters of low aliphatic alcohols, i. e. the methyl-, ethyl-, propyl-, isobutyl-, butyl- and similar esters. There may, for example be named: alpha-cyano-cinnamic acid methyl ester, alpha-cyano-ortho-methoxy-cinnamic acid isopropyl ester, alpha-cyano-meta-methoxy-cinnamic acid ethyl ester, furthermore cinnamic acid esters which in the aromatic radical are substituted by chlorine.

As indolyl-magnesium halides there may be used the chlorides, bromides and iodides. The compounds may be substituted in the indolyl radical in 2-position by low alkyl groups, such as methyl and ethyl. Furthermore, substituents, such as chlorine or alkoxy groups, may still be present in the phenyl radical. There may be named, for example, indolyl magnesium bromide, 2-methyl-indolyl magnesium chloride, 2-ethyl-indolyl magnesium iodide, 2-methyl-5-chloromagnesium bromide, 2-methyl-5-methoxy-magnesium bromide and others.

The new products are distinguished by valuable therapeutic properties and shall be used as remedies. They possess a good diuretic action and over the already known compounds they are distinguished by their excellent sympathicolytic action. They are indicated as remedies for the treatment of headache, especially migraine.

The following examples serve to illustrate the invention, but they are not intended to limit it thereto, the parts being by weight:

Example 1

234 parts of indol in 500 parts of ether are added, dropwise, to a solution of ethyl-magnesium bromide which has been prepared from 48 parts of magnesium, 230 parts of ethyl bromide and 1000 parts of ether. The mixture is allowed to stand over night and 225 parts of alpha-cyano-cinnamic acid methyl ester dissolved in 1500 parts of benzene, are then added. After the main portion of ether and benzene have been distilled off at the descending refrigerator, the reaction product is poured on ice and decomposed with glacial acetic acid. After a standing over night, the reddish crystals are filtered with suction and well washed with benzene. They are recrystallized from benzene; 267 parts of alpha-cyano-beta-indolyl-beta-phenyl-propionic acid methyl ester are then obtained in the form of feebly pink crystals melting at 122° C.–123° C. and crystallizing with ½ mol. of benzene of crystallization.

345 parts of the ester thus produced are heated with 45.5 parts of sodium hydroxide in 1600 parts of water for two hours on the steam bath. After the benzene has escaped and nearly the entire product has been dissolved, the solid sodium salt separates. It is acidified with 60 parts of glacial acetic acid and extracted with ether. After the ether solution has been dried and the ether evaporated, the residue is heated together with 200 parts of quinoline for 15 minutes to 170° C. The quinoline is then driven off with steam and a crystalline residue is obtained which, after washing with alcohol, yields 90 parts of colorless crystals of beta-indolyl-beta-phenyl-propionitrile melting at 143° C.–144° C.

12.3 parts of the nitrile thus produced are suspended in 40 parts of absolute alcohol, and hydrochloric acid gas is introduced, while cooling with ice, until saturation has set in. After having been allowed to stand over night, the clear solution is mixed with 1000 parts of absolute ether, the pink crystals of the imino-ether are filtered with suction and washed with ether. After drying, 14.7 parts of the imino-ether are obtained which are introduced into the ice-cooled solution of 5 parts by volume of ethylene-diamine and 50 parts by volume of alcohol. After standing over night and evaporation of the solvent under reduced pressure, a sirup is obtained which, after having been triturated with ether, yields 14.1 parts of colorless crystals. Recrystallized from alcohol, the indolyl-phenyl-ethyl-imidazoline hydrochloride is obtained in the form of colorless crystals melting at 112° C. (with decomposition) and crystallizing with 1 mol of water.

Instead of the alpha-cyano-cinnamic acid methyl ester there may be used the alpha-cyano-cinnamic acid isopropyl ester or the alpha-cyano-cinnamic acid butyl ester.

Example 2

196 parts of 2-methyl-indol in 400 parts of ether are added, dropwise, to a solution of ethyl-magnesium bromide prepared from 48 parts of magnesium, 230 parts of ethyl bromide and 1000 parts of ether. The mixture is allowed to stand over night and 220 parts of alpha-cyano-cinnamic acid methyl ester, dissolved in 1000 parts of benzene, are then added. The further treatment is the same as that described in Example 1 and 370 parts of alpha-cyano-beta-2-methyl-indolyl-beta-phenyl-propionic acid methyl ester are obtained, melting at 126° C.

157 parts of the ester thus formed together with 24 parts of sodium hydroxide in 500 parts of methanol and 50 parts of water are heated for 4 hours on the steam bath under reflux. The solvent is evaporated under reduced pressure, the residue is dissolved in water and extracted with ether, so as to remove neutral portions. The solution is then acidified and extracted with ether. After drying and evaporation of the ether solution, the residue is heated together with 100 parts of quinoline for 30 minutes to 170° C.–180° C. and the quinoline is then expelled with steam. The oil which remains is taken up in ether and the ethereal solution is dried over calcium chloride. After the evaporation of the ether is complete, a residue is obtained which, when recrystallized from alcohol, yields 75 parts of beta-2-methyl-indolyl-beta-phenyl-propionitrile in the form of colorless crystals melting at 125° C.

26 parts of the nitrile thus produced are treated, as described in Example 1, with 35 parts of methanol and hydrochloric acid gas, 26 parts of imino-ether are obtained which are introduced, while cooling with ice, into 10 parts of ethylene-diamine which has been dissolved in 50 parts of methanol. During this introduction the imino-ether dissolves and after some minutes colorless crystals separate from the solution. After standing over night, 27.3 parts of colorless crystals are obtained melting at 265° C. When these crystals are dissolved in methanol and the major portion of the solvent has been evaporated, they yield the 2-methyl-indolyl-phenyl-ethyl-imidazoline-hydrochloride melting at 267° C.

Example 3

109 parts of ethyl bromide are added, dropwise, while stirring, to 24 parts of magnesium chips and 93.6 parts of indol in 500 parts of absolute ether. After the reaction is complete, 175 parts of alpha-cyano-meta-methoxy-cinnamic acid methyl ester dissolved in 500 parts of benzene are added. The further treatment is the same as that described in Example 1. 250 parts of a crude product are obtained which, when recrystallized from benzene, yields 176 parts of alpha-cyano-beta-indolyl-beta-meta-methoxy-phenyl-propionic acid methyl ester in the form of colorless crystals melting at 129° C. 178 parts of the ester thus produced are heated for 4 hours on the steam bath together with 21.3 parts of sodium hydroxide and 533 parts of water. A clear solution is formed which is acidified with dilute hydrochloric acid and extracted with ether. After the ether has been evaporated, the residue is heated for 15 minutes to 170° C. together with 100 parts of quinoline. The product is then worked up as described in Example 2 and recrystallized from methanol. There are obtained 106 parts of beta-indolyl-beta-meta-methoxy-phenyl-propionitrile in the form of colorless crystals melting at 119° C.–120° C.

27.6 parts of the nitrile thus formed are treated, in 30 parts of methanol, with hydrochloric acid gas and worked up as described in Example 1. 30 parts of imino-ether are obtained into which 10 parts of ethylene-diamine dissolved in 50 parts by volume of methanol are introduced, while cooling with ice. After standing for several days in an open vessel and trituration, 17 parts of coarse crystals are obtained which, when recrystallized from alcohol, yield the indolyl-meta-methoxy-phenyl-ethyl-imidazoline hydrochloride in the form of colorless crystals melting at 120° C. (with decomposition) and crystallizing with 1 mol of crystal water.

Instead of alpha-cyano-meta-methoxy-cinnamic acid methyl ester the corresponding propyl ester may be used.

Example 4

109 parts of ethyl bromide are added dropwise, while stirring, to 24 parts of magnesium and 105 parts of 2-methyl-indol in 500 parts of ether. After the reaction is complete, stirring is continued for 1 hour. 175 parts of alpha-cyano-meta-methoxy-cinnamic acid methyl ester dissolved in 500 parts of benzene are then added. The major part of ether and benzene are evaporated, the residue is decomposed with ice and dilute glacial acetic acid and the oil is taken up in ether. After drying and evaporation of the ether 299 parts of a dark oil are obtained which is worked up without a purification taking place.

299 parts of the crude product thus produced, 35 parts of sodium hydroxide and 875 parts of water are heated for 3 hours on the steam bath. After the further treatment as described in Example 2, the product is recrystallized from alcohol and 97 parts of beta-2-methyl-indolyl-beta-meta-methoxy-phenyl-propionitrile are then obtained in the form of colorless crystals melting at 139° C.

58 parts of the nitrile thus formed are suspended in 100 parts of methanol. Hydrochloric acid gas is passed in, while cooling with ice until saturation sets in. After standing over night, the dark, clear solution is evaporated under reduced pressure and the crystalline residue of the imino-ether is well washed with ether. After drying, 62 parts of the imino-ether are obtained which is introduced, while cooling with ice, into 20 parts by volume of ethylene-diamine dissolved in 100 parts by volume of methanol. At the beginning, a solution is present, but after some minutes colorless crystals separate. 51 parts of a crude product are obtained which, by dissolving it in alcohol and evaporating the major part of the solvent, yields the 2-methyl-indolyl-meta-methoxy-phenyl-ethyl-imidazoline hydrochloride in the form of colorless crystals melting at 224° C.

Example 5

109 parts of ethyl bromide are added dropwise, while stirring into 24 parts of magnesium chips and 133 parts of 5-chloro-2-methylindol in 600 parts of absolute ether. After the reaction is complete, 175 parts of alpha-cyano-meta-methoxy-cinnamic acid methyl ester dissolved in 500 parts of benzene are added and the reaction mixture is worked up as described in Example 4. 347 parts of a dark oil are obtained which is further treated without a purification being necessary.

347 parts of the crude product thus produced, 36.3 parts of sodium hydroxide and 908 parts of water are heated together for 4 hours on the steam bath. The mixture is further treated as described in Example 2 and recrystallized from alcohol. There are thus obtained 170 parts of beta-2-methyl-5-chloro-indolyl-beta-meta-methoxy-phenyl-propionitrile in the form of colorless crystals melting at 144° C.

32.5 parts of beta-2-methyl-5-chloro-indolyl-beta-meta-methoxy-phenyl-propionitrile are suspended in 50 parts of methanol. Hydrochloric acid gas is passed in, while cooling with ice, until saturation is complete. The solution is allowed to stand for several days and then poured into 1000 parts of absolute ether. The imino-ether which has separated is filtered with suction and well washed with absolute ether. After drying, 35 parts of the imino-ether are obtained which is introduced, while cooling with ice, into a solution of 10 parts by volume of ethylene-diamine in 50 parts by volume of methanol. First, a clear solution is formed from which colorless crystals separate after 2 hours. 31.6 parts of a crude product are obtained. By dissolving it in methanol and evaporating the major part of the solvent, the 2-methyl-5-chloro-indolyl-meta-methoxy-phenyl-ethyl-imidazoline-hydrochloride is obtained in the form of colorless crystals melting at 273° C. (with decomposition).

We claim:

1. A compound selected from the group consisting of compounds of the general formula

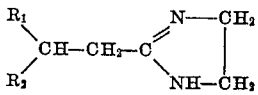

wherein R₁ is a member selected from the group consisting of phenyl and methoxy phenyl radicals and R₂ is a member selected from the group consisting of an indolyl-(3)-2-methyl-indolyl-(3) and 2-methyl-5-chloro-indolyl-(3) radicals, and the hydrochlorides thereof.

2. A compound of the formula

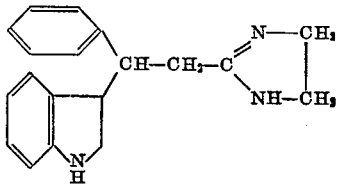

3. A compound of the formula

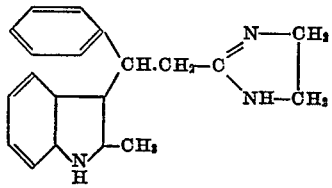

4. A compound of the formula

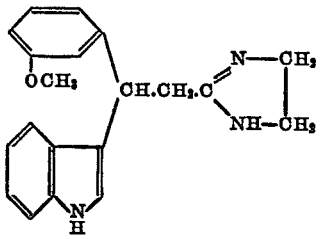

5. A compound of the formula

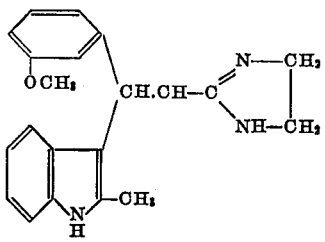

6. A compound of the formula

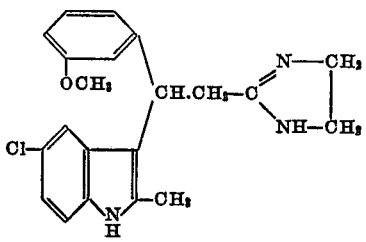

References Cited in the file of this patent

UNITED STATES PATENTS

| | | |
|---|---|---|
| 2,161,938 | Sonn | June 13, 1939 |
| 2,252,721 | Miescher et al. | Aug. 19, 1941 |
| 2,252,723 | Miescher et al. | Aug. 19, 1941 |
| 2,505,247 | Isler | Apr. 25, 1950 |

OTHER REFERENCES

Scholz, J. Ind. and Eng. Chem., vol. 37, pp. 120–125 (1945).